United States Patent
Talcott et al.

(10) Patent No.: US 6,615,343 B1
(45) Date of Patent: Sep. 2, 2003

(54) MECHANISM FOR DELIVERING PRECISE EXCEPTIONS IN AN OUT-OF-ORDER PROCESSOR WITH SPECULATIVE EXECUTION

(75) Inventors: Adam R. Talcott, San Jose, CA (US); Daniel L. Liebholz, Cambridge, MA (US); Sanjay Patel, Fremont, CA (US); Richard H. Larson, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 629 days.

(21) Appl. No.: 09/599,227

(22) Filed: Jun. 22, 2000

(51) Int. Cl.$^7$ .................................................. G06F 9/38
(52) U.S. Cl. ...................................................... 712/244
(58) Field of Search .......................... 712/244; 710/260, 710/262

(56) References Cited

U.S. PATENT DOCUMENTS

| | | | |
|---|---|---|---|
| 5,778,219 A | * 7/1998 | Amerson et al. | 712/244 |
| 5,809,275 A | 9/1998 | Lesartre | 395/392 |
| 5,881,280 A | * 3/1999 | Gupta et al. | 712/244 |
| 5,915,117 A | * 6/1999 | Ross et al. | 710/262 |
| 6,049,868 A | 4/2000 | Panwar | 712/244 |
| 6,282,636 B1 | * 8/2001 | Yeh et al. | 712/218 |
| 6,505,296 B2 | * 1/2003 | Morris et al. | 712/244 |

FOREIGN PATENT DOCUMENTS

JP 2000-29857 A 1/2000

OTHER PUBLICATIONS

J. L. Hennessy and D. A. Patterson; "Computer Architecture: A Quantitative Approach," Morgan Kaufmann Publishers, Inc., San Mateo, CA (1990), pp. 214–219.
PCT International Search Report, Nov. 15, 2001, 3 pages.

\* cited by examiner

Primary Examiner—William M. Treat
(74) Attorney, Agent, or Firm—Rosenthal & Osha L.L.P.

(57) ABSTRACT

A method of handling an exception in a processor includes setting a state upon detection of an exception, signaling a trap for the exception if the state is set, and based on a class of the exception, processing the exception differently before signaling the trap. The method may include replaying an instruction causing the exception before signaling the trap for the exception based on the class of the exception. The method may include replaying the instruction causing the exception after the instruction causing the exception becomes an oldest, unretired instruction. The method may include signaling the trap for the exception after an instruction causing the exception becomes an oldest, unretired instruction. The method may include marking an instruction causing the exception as complete without issuing the instruction causing the exception. An apparatus for handling exceptions in a processor includes an instruction scheduler for setting a state upon detection of an exception and signaling a trap for the exception if the state is set. The instruction scheduler, based on a class of the exception, processes the exception differently before signaling the trap.

11 Claims, 3 Drawing Sheets

MECHANISM FOR DELIVERING PRECISE EXCEPTIONS IN AN OUT-OF-ORDER PROCESSOR WITH SPECULATIVE EXECUTION

BACKGROUND OF THE INVENTION

Computer processors contain arithmetic, logic, and control circuitry that interpret and execute instructions from a computer program. In the pursuit of improving processor performance, designers have sought two main goals: making operations faster and executing more operations in parallel. Making operations faster can be approached in several ways. For example, transistors can be made to switch faster and thus propagate signals faster by improving semiconductor processes; execution-unit latency can be reduced by increasing the number of transistors in the design; and the levels of logic required by the design to implement a given function can be minimized to increase speed. To execute more operations in parallel, designers mainly rely on one, or a combination of pipelining and superscalar techniques. Pipelined processors overlap instructions in time on common execution resources. Superscalar processors overlap instructions in space on separate resources.

Pipeline stalls are a main performance inhibitor with regard to parallel processing. Stalls arise from data dependencies, changes in program flow, and hardware resource conflicts. At times, pipeline stalls can be avoided by rearranging the order of execution for a set of instructions. Compilers can be used to statically reschedule instructions, however, incomplete knowledge of run-time information reduces the effectiveness of static rescheduling. In-order processors, i.e., processors that issue, execute, complete, and retire instructions in strict program order, have to rely entirely on static rescheduling and thus are prone to pipeline stalls.

As a result, designers use out-of-order processors and seek to implement dynamic instruction rescheduling. The simplest out-of-order processors issue instructions in order but allow them to execute and complete out of order. Even these simple out-of-order processors require complex hardware to reorder results before the corresponding instructions are retired. A strict result order is not required from a data-flow perspective, however, such ordering is necessary to maintain precise exceptions and to recover from mispredicted speculative execution.

A well-known method of reordering is through the use of a reorder buffer, i.e., a buffer that maintains results until written to the register file in program order. Designers also use other types of reordering hardware, such as history buffers and future files. History buffers record source-operand history so the processor can backtrack to a precise architectural state and future files store the current state and the architectural state in separate register files allowing the processor to be restored to a precise check-point state.

Branch prediction and speculative execution are additional techniques used to reduce pipeline stalls. In a pipelined processor, the outcomes of conditional branches are often determined after fetching subsequent instructions. Thus, if the correct direction of the unresolved branch can be predicted, the instruction queue can be kept full of instructions that have a high probability of being used. In some processors, instructions are actually executed speculatively beyond unresolved conditional branches. This technique completely avoids pipeline stalls when the branch proceeds in the predicted direction. On the other hand, if the branch direction is mispredicted, the pipeline must be flushed, instruction fetch redirected, and the pipeline refilled.

It is also important to effectively process and handle instruction exceptions, i.e., an event that suspends normal processing for a given instruction. When an instruction exception is encountered, the flow of control is temporarily diverted through a trap handler. A trap handler is a routine that investigates the cause of the exception and completes any processes necessary to discharge the exception. Generally, processors store certain information required by trap handlers. This information includes the current state of running programs, identification of the source of the exception, etc.

Instruction exceptions are fairly rare, however, if encountered, preserving the state of the processor precisely as it was before the instruction executed is extremely useful. Such precise exceptions allow for easier diagnosis of exceptions by trap handlers. However, achieving precise exceptions without slowing down the common case where no exceptions are encountered is a difficult task. This is particularly true in an out-of-order processor where an instruction generating an exception may be issued and executed when the instruction is very young, i.e., fetched more recently than other given instructions.

Referring to FIG. 1, a typical computer system includes a microprocessor (10) having, among other things, a CPU (12), a load/store unit (14), and an on-board cache memory (16). The microprocessor (10) is connected external cache memory (17) and a main memory (18) that both hold data and program instructions to be executed by the microprocessor (10). Internally, the execution of program instructions is carried out by the CPU (12). Data needed by the CPU (12) to carry out an instruction are fetched by the load/store unit (14) and loaded into internal registers (15) of the CPU (12). A memory queue (not shown) maintains a list of outstanding memory requests. The load/store unit adds requests into the memory queue and also loads registers with values from the memory queue. Upon command from the CPU (12), the load/store unit (14) searches for the data first in the fast on-board cache memory (16), then in external cache memory (17), and finally in the slow main memory (18). Finding the data in the cache memory is referred to as a "hit." Not finding the data in the cache memory is referred to as a "miss."

SUMMARY OF THE INVENTION

In one aspect, a method of handling an exception in a processor comprises setting a state upon detection of an exception, signaling a trap for the exception if the state is set, and based on a class of the exception, processing the exception differently before signaling the trap. The method may comprise replaying an instruction causing the exception before signaling the trap for the exception based on the class of the exception. The method may comprise replaying the instruction causing the exception after the instruction causing the exception becomes as oldest, unretired instruction. The method may comprise signaling the trap for the exception after an instruction causing the exception becomes an oldest, unretired instruction. The method may comprise marking an instruction causing the exception as complete without issuing the instruction causing the exception.

In one aspect, an apparatus for handling exceptions in a processor comprises an instruction scheduler for setting a state upon detection of an exception and signaling a trap for the exception if the state is set. The instruction scheduler, based on a class of the exception, processes the exception differently before signaling the trap. The instruction scheduler based on the class of the exception may replay an instruction causing the exception before signaling the trap for the exception. The instruction scheduler may replay an instruction causing the exception after the instruction causing the exception becomes an oldest, unretired instruction. The instruction scheduler may signal the trap for the exception after an instruction causing the exception becomes an oldest, unretired instruction. The instruction scheduler may mark an instruction causing the exception as complete without issuing the instruction causing the exception.

In one aspect, an apparatus for handling exceptions in a processor comprises means for setting a state upon detection of an exception, means for signaling a trap for the exception when the state is set, and means for processing the exception differently based on a class of the exception before the signaling of the trap.

Other aspects and advantages of the invention will be apparent from the following description and the appended claims.

DETAILED DESCRIPTION OF THE INVENTION

Figure 1:
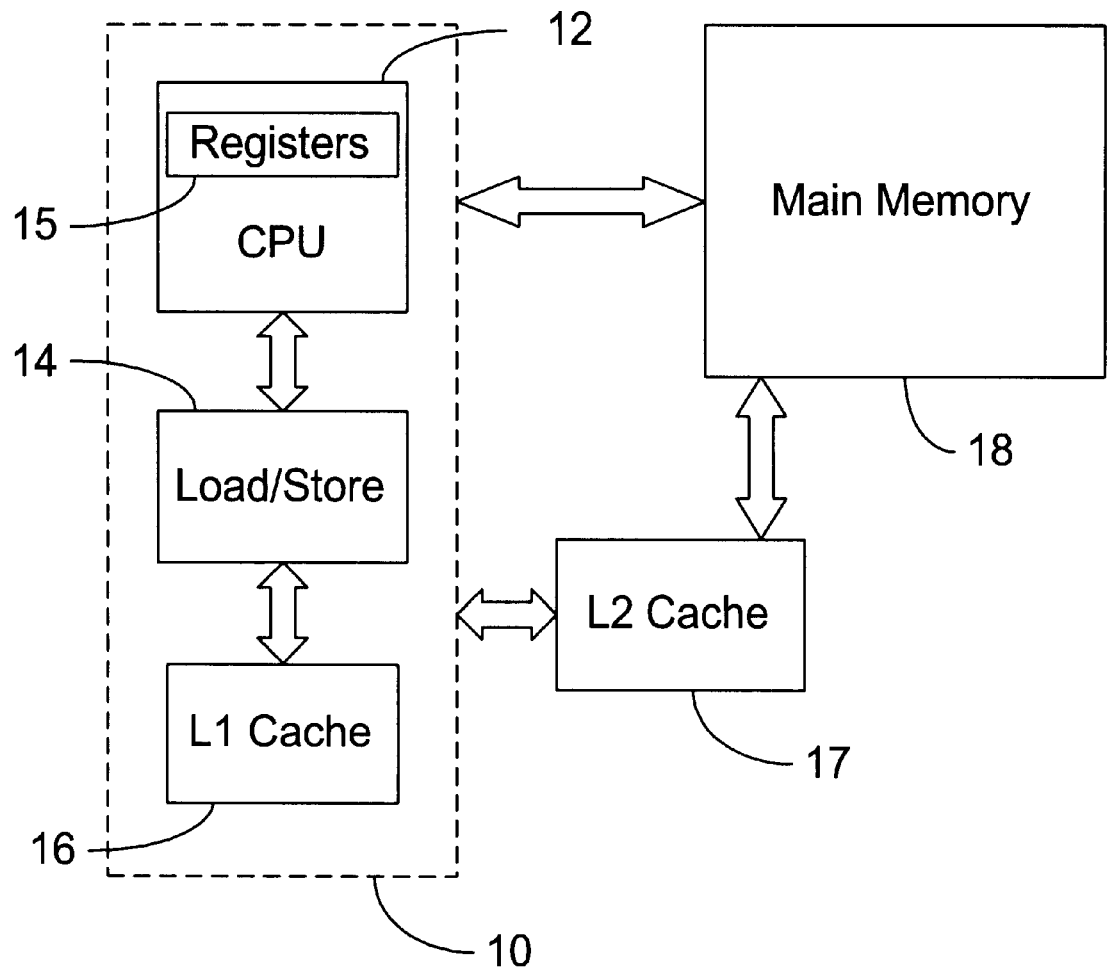
FIG. 1 shows a typical computer system.
Figure 2:
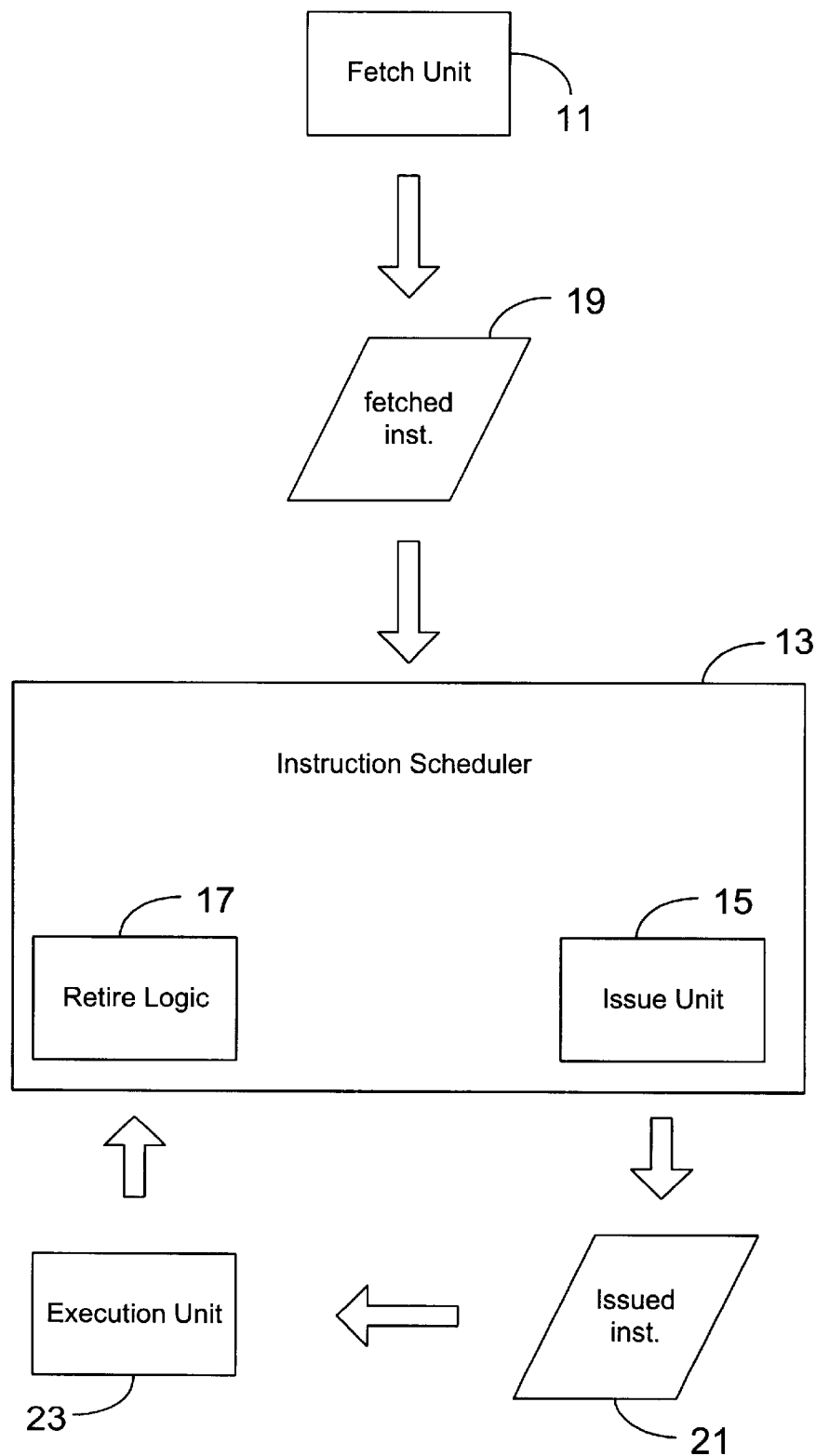
FIG. 2 is a block diagram in accordance with an embodiment of the present invention

Various embodiments of the invention will now be described with reference to the accompanying figures. Referring to FIG. 2, in general, in one or more embodiments, the invention can be embodied in a processor design having a fetch unit (11) and an instruction scheduler (13). The instruction scheduler (13) includes an issue unit (15) and retire logic (17). The issue unit (15) handles issuing instructions and pre-issuance processing. On the other hand, retire logic (17) handles post-issuance processing of instructions. As will be discussed in more detail later, front-end exceptions occur prior to, and prompt the prevention of, the issuance of the instruction causing the exception, whereas back-end exceptions are handled after the instruction causing the exception has been issued.

The fetch unit (11) fetches an instruction and passes the fetched instruction (19) to the instruction scheduler (13). The issue unit (15) of instruction scheduler (13) then issues the fetched instruction (19) as issued instruction (21). An issued instruction is sent to an execution unit (23) and then returns to retire logic (17) to retire. Depending on when an exception associated with an instruction occurs, the handling of the exception proceeds through a different series of steps. If the exception is a front-end exception, the fetch unit detects the exception and marks the appropriate bit. If the exception is a back-end exception, the execution unit detects the exception and marks the appropriate bit. The steps taken in processing exceptions and the bits marked are discussed with reference to FIG. 3 below. In any case, the instruction scheduler (13) communicates a detected exception to the fetch unit (11) which, in turn, calls a trap handler (not shown). The trap handler is a software tool for resolving exceptions. When communicating the occurrence of an exception to the fetch unit (11) for calling of the trap handler, this is referred to as signaling a trap. Those skilled in the art will appreciate that multiple instructions may be fetched simultaneously and that the described functions may be carried out by other units based on the processor design.

Figure 3:
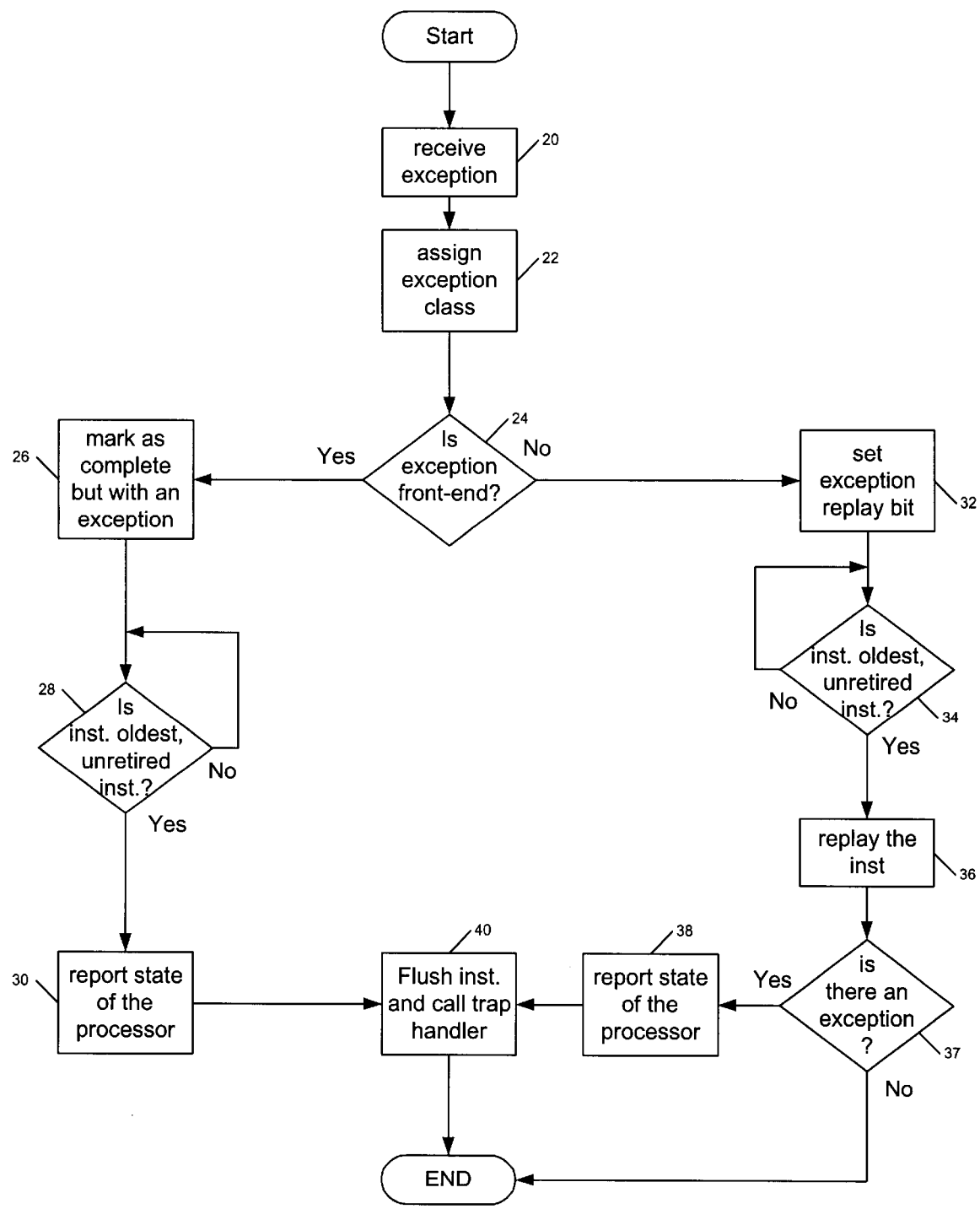
FIG. 3 is a flow chart showing a process in accordance with an embodiment of the present invention.

Referring to FIG. 3, in accordance with one embodiment, a process of enabling precise exception reporting in an out-of-order processor is shown. First, when an exception is received (step 20), the exception is assigned a class (step 22). In the example shown, each exception is assigned to one of two possible classes. An exception is either a front-end exception or a back-end exception based on the type of exception. While those skilled in the art will appreciate that many variations are possible, the exemplary process includes detecting one of the classes, e.g., front-end exceptions, and defaulting to the other, e.g., back-end exceptions. Front-end exceptions are detected before the instruction is inserted into the issue queue or queues. These exceptions are typically of a very high priority and therefore take precedence over all other possible exceptions for that instruction. Back-end exceptions, on the other hand, occur after the instruction has been issued to an execution unit. Essentially, front-end exceptions are those that occur prior to, and prompt the prevention of, the issuance of an instruction, while back-end exceptions are those that occur after the issuance of an instruction.

Thus, the process continues by determining whether the exception is a front-end exception (step 24). If so, to guarantee that front-end exceptions are reported in a precise manner, the instruction is marked in such a way that the instruction issue logic will not issue the instruction. This also guarantees that an instruction already known to be in error does not corrupt any other state by issuing, executing, or retiring. When such an instruction enters the instruction queue, it will be marked as complete but with an exception (step 26). An instruction marked as complete without an exception will eventually retire. Once an instruction marked as complete with an exception becomes the oldest, unretired instruction (step 28), the exception will be reported (step 30) and the state of the processor will reflect only the execution of all older instructions.

Back-end exceptions are more complicated because the instructions causing back-end exceptions issue and complete out of order. Therefore, if a back-end exception is encountered, an exception replay bit, i.e., a bit in an instruction's entry in the instruction queue, is set for the instruction that generated the back-end exception (step 32). No other action is taken until the instruction becomes the oldest, unretired instruction in the processor (step 34). Once the instruction is the oldest, unretired instruction, the instruction is reissued, or replayed (step 36). If, upon replay, no exception is generated (step 37) the process ends and the instruction is allowed to retire normally. On the other hand, if the exception is generated on replay, the exception information is recorded when the instruction completes (step 38). Replaying an instruction that generates an exception allows a single register for recording the trap information to be used. Those skilled in the art will appreciate that otherwise there would need to be one register per instruction. Also, the exception replay guarantees that the error registers maintained outside of the instruction retirement logic are not corrupted due to incorrect speculation, data cache misses, etc. Finally, instruction fetch logic is notified of the trap and all instructions are flushed prior to fetching the trap handler (step 40).

If for some reason, an instruction cannot be executed twice, the execution unit detects this and sets a "do not exception replay" bit, which accompanies the exception bit. Retirement logic will simply not replay the instruction if the "do not exception replay" bit is set. This may be required for instructions with side effects, such as load/store operations to I/O space. Further, note that, if the instruction does not encounter an exception when reissued, the instruction is allowed to retire normally. Those skilled in the art will appreciate that the exception bit and exception replay bit may be implemented using the same bit and that, in such a case, the difference in timing or source of the detection of the exception would be used to dictate which action is to be taken.

If a front-end exception is pending, the front-end exception can be overwritten by all back-end exceptions generated by older instructions. This is because traps need to be signaled in program order. Thus, if a back-end exception is encountered from an older instruction, the back-end exception must be handled before any younger front-end exceptions. Also, if the two exceptions are not related, the front-end exception will be reported again once the trap handler for the back-end exception completes and the younger instruction is re-fetched.

It is important to note that every time an instruction issues, the processor's rename state is modified but the processor's architectural state is not. This allows the exception to be reported in a precise manner. Those skilled in the art will appreciate that mechanisms other than register renaming are also suitable but may require that the correct architectural state of the processor be restored before the trap handler is fetched.

Advantages of the present invention may include one or more of the following. Exceptional events occurring in an out-of-order processor can be precisely reported and handled. In view of the detection and marking, front-end exceptions are not issued. Further, because back-end exceptions are replayed and only a single front-end exception is handled at a given time, only a single trap register is necessary.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A method of handling an exception in a processor comprising:

setting a state upon detection of an exception;

signaling a trap for the exception if the state is set; and based on a class of the exception, processing the exception differently before signaling the trap.

2. The method of claim 1 further comprising:

replaying an instruction causing the exception before signaling the trap for the exception based on the class of the exception.

3. The method of claim 2 further comprising:

replaying the instruction causing the exception after the instruction causing the exception becomes an oldest, unretired instruction.

4. The method of claim 1 further comprising:

signaling the trap for the exception after an instruction causing the exception becomes an oldest, unretired instruction.

5. The method of claim 1 further comprising:

marking an instruction causing the exception as complete without issuing the instruction causing the exception.

6. An apparatus for handling exceptions in a processor comprising:

an instruction scheduler for
      setting a state upon detection of an exception; and
      for signaling a trap for the exception if the state is set; and wherein the instruction scheduler, based on a class of the exception, processes the exception differently before signaling the trap.

7. The apparatus of claim 6 wherein the instruction scheduler is further for replaying an instruction causing the exception before signaling the trap for the exception based on the class of the exception.

8. The apparatus of claim 7 wherein the instruction scheduler is further for replaying the instruction causing the exception after the instruction causing the exception becomes an oldest, unretired instruction.

9. The apparatus of claim 6 wherein the instruction scheduler is further for signaling the trap for the exception after an instruction causing the exception becomes an oldest, unretired instruction.

10. The apparatus of claim 6 wherein the instruction scheduler is further for marking an instruction causing the exception as complete without issuing the instruction causing the exception.

11. An apparatus for handling exceptions in a processor comprising:

means for setting a state upon detection of an exception;

means for signaling a trap for the exception if the state is set; and means for processing the exception differently based on a class of the exception before the signaling of the trap.

* * * * *